United States Patent
Laury et al.

(10) Patent No.: US 6,864,898 B1
(45) Date of Patent: Mar. 8, 2005

(54) ERROR DISTRIBUTION FOR THE APPROXIMATION OF THE PIXEL COLOR OF A DIGITAL IMAGE

(75) Inventors: Marc Laury, Grenoble (FR); Franck Seigneret, Rives (FR); Emmanuel Chiaruzzi, Grenoble (FR)

(73) Assignee: STMicroelectronics S.A., Gentilly (FR)

( * ) Notice: Subject to any disclaimer, the term of this patent is extended or adjusted under 35 U.S.C. 154(b) by 403 days.

(21) Appl. No.: 09/660,850

(22) Filed: Sep. 13, 2000

(30) Foreign Application Priority Data

Sep. 14, 1999 (FR) .......................................... 99 11607

(51) Int. Cl.[7] ................................................ G09G 5/00
(52) U.S. Cl. ...................................... 345/616; 345/611
(58) Field of Search ................................ 345/581, 611, 345/616, 597, 601; 382/252; 358/3.03–3.05

(56) References Cited

U.S. PATENT DOCUMENTS

| | | | | |
|---|---|---|---|---|
| 4,878,125 A | * | 10/1989 | Katayama et al. | 358/443 |
| 4,903,317 A | * | 2/1990 | Nishihara et al. | 382/244 |
| 4,982,292 A | * | 1/1991 | Itoh et al. | 382/233 |
| 5,045,952 A | * | 9/1991 | Eschbach | 358/447 |
| 5,065,234 A | | 11/1991 | Hung et al. | 358/80 |
| 5,172,247 A | * | 12/1992 | Ghaderi | 358/3.03 |
| 5,315,415 A | | 5/1994 | Kawai et al. | 358/515 |
| 5,317,653 A | * | 5/1994 | Eschbach et al. | 382/252 |
| 5,353,127 A | * | 10/1994 | Shiau et al. | 382/252 |
| 5,479,538 A | * | 12/1995 | Takahashi | 382/270 |
| 5,712,927 A | * | 1/1998 | Kim et al. | 382/252 |
| 5,760,918 A | * | 6/1998 | Tanioka et al. | 358/445 |
| 5,974,173 A | | 10/1999 | Kimura | 382/167 |
| 6,172,768 B1 | * | 1/2001 | Yamada et al. | 358/1.9 |
| 6,356,361 B1 | * | 3/2002 | Ishikawa et al. | 358/1.9 |
| 6,459,817 B1 | * | 10/2002 | Matsushiro | 382/251 |
| 6,476,824 B1 | * | 11/2002 | Suzuki et al. | 345/690 |
| 6,496,603 B1 | * | 12/2002 | Chang | 382/252 |

* cited by examiner

Primary Examiner—Matthew C. Bella
Assistant Examiner—Po-Wei Chen
(74) Attorney, Agent, or Firm—Lisa K. Jorgenson; Dennis M. de Guzman; SEED IP Law Group PLLC

(57) ABSTRACT

A method of approximation of the respective colors of pixels of a digital image by selecting, from a look-up table and successively for each pixel of the image, a color, the code of which comes close with the smallest error to the sum of the code of the current pixel color and of a correction term, in which the correction term is equal to the smallest error calculated upon approximation of a preceding pixel, assigned with a weighting coefficient depending on the position of the current pixel in the image.

20 Claims, 2 Drawing Sheets

ERROR DISTRIBUTION FOR THE APPROXIMATION OF THE PIXEL COLOR OF A DIGITAL IMAGE

TECHNICAL FIELD

The present invention relates to the processing of digital images and in particular to the reduction of the colors of a digital image to the colors of a color look-up table of reduced size.

BACKGROUND OF THE INVENTION

A digital image is conventionally formed of pixel rows and columns. Each pixel, located by an abscissa and an ordinate, is in particular associated with a color. The colors of all pixels of a same image are conventionally coded with a same number of bits, this number determining the number of possible colors for each pixel. As an example, a coding (called RGB coding) is considered, in which the colors are represented by three components: red (R), green (G), and blue (B), each of which is coded over eight bits. Such a coding enables describing $2^{3 \times 8}$, that is, more than 16 million different colors.

FIG. 1 very schematically shows a fragment of a digital image 2, organized in pixel lines and columns. Each pixel i of image 2 is located by an abscissa X(i) and an ordinate Y(i), and is associated with a color RGB(i). In FIG. 1, the two first pixels 0 and 1 of the first line of image 2 have been shown. Considering that image 2 is organized in lines of n pixels, the two first pixels of the second image line are designated by n and n+1. An example of color coded over 24 bits has been associated with each of the shown pixels. For clarity, each of components R(i), G(i), and B(i) is shown in hexadecimal. Pixel 0 has a color RGB(0)=F11, pixel 1 has a color RGB(1)=1A1, pixel n has a color RGB(n)=1B0, and pixel n+1 has a color RGB(n+1)=CE0.

In certain applications, it may be desired to reduce the number of bits associated with the colors of a digital image. An image of a given number of pixels having its colors coded over a large number of bits represents a large number of bits, and reducing this number may enable storing the image in a reduced memory space or transmitting it, for example with a modem, in a shorter time.

A known solution consists of creating a look-up table, or color look-up table (CLUT) containing a restricted number of colors coded like the original colors of the pixels. Each pixel then is associated with an address chosen in the look-up table, which corresponds to the CLUT color that is closest to its original color.

FIG. 2 schematically shows a circuit 4 enabling performing an approximation such as described hereabove of the color of the pixels of an image. Circuit 4 includes a memory (MEM) 6 in which are stored the CLUT colors and an evaluation circuit (EVAL) 8, a first input of which receives the CLUT colors, and a second input of which successively receives the original color of each pixel. For the type of coding taken as an example, if Rp, Gp, and Bp are the components of a color of the look-up table, the difference between an original color RGB(i) of a pixel i and this color can be calculated as $|R(i)-Rp|+|G(i)-Gp|+|B(i)-Bp|$. The search for the closest CLUT color to the original color of a pixel can be performed by systematically scanning the entire look-up table, but can also be performed by means of faster search algorithms, for example, a search algorithm taking the successive median colors between the closest colors obtained in the look-up table for the preceding evaluations of the same pixel while however determining, for each evaluation, the sign of the difference. Once it has determined the CLUT color which is closest to the original color of a pixel, evaluation circuit 8 selects this CLUT color (CLUT (RGB(i))) by associating with pixel i the address of this color in the color look-up table. As indicated previously, the color look-up table includes a reduced number of colors. The address of the CLUT colors thus comprises a reduced number of bits. By replacing for each pixel of an image the code of its original color by such an address, the memory size of the digital image is substantially reduced. As an example, by associating with the colors coded over 24 bits of a digital image an address of a color of a color look-up table of 256 colors, coded over 8 bits, the size of this image is substantially divided by 3.

FIG. 3 very schematically shows a digital image 10 corresponding to digital image 2 of FIG. 1 after approximation of its colors. In the case shown, it is assumed that the CLUT colors that are closest to the original colors of pixels 0, 1, n and n+1 of image 2 respectively are the colors having codes F00, 1A0, 1A0 and CA0. Evaluation circuit 8 associates CLUT color F00 with original color F11 of pixel 0, CLUT color 1A0 with original colors 1A1 of pixel 1 and 1B0 of pixel n, and CLUT color CA0 with original color CE0 of pixel n+1.

It should be noted that such an approximation method results in a loss of information by associating with several different original colors the same CLUT color. Thus, it eliminates from an image the color blendings that may be present, and it creates uniform color areas abruptly separated from one another. This phenomenon is particularly disturbing, for example, when the digital image includes areas such as a face, including many blendings of flesh color of different shades, exhibiting a low contrast with respect to one another. The previously-described approximation of the colors of a face conventionally displays a reduced number of areas with a strong contrast between one another, which is not very attractive.

Such a problem can be attenuated by a judicious choice of the color look-up table. In the preceding example, this amounts to storing in the CLUT a sufficient number of shades of flesh color to enable a convenient approximation of the color blendings in a face. However, such a solution is not always implementable, the CLUT size being limited.

Another known solution to attenuate the contrast between the color areas created by the preceding approximation method consists of artificially mixing the colors of the pixels located at the border of the areas of same color in the image. Thereby, after approximation, the separation border between the color areas is no longer clear, but has the aspect of a cloud of points. The human eye mixes the colors of the points of this cloud into a homogeneous color and it accepts this recomposed color as being an intermediary color between the two color areas. This mixing of the border pixel color is performed by adding a correction term to the original color of each pixel before its approximation. This correction term is a function of the evaluation errors of the preceding pixels, each assigned with predetermined weighting coefficients.

FIG. 4 schematically shows the preceding pixels i−1, i−n−1, i−n and i−n+1 conventionally used for approximating the original color of a pixel i of an image 2. It should be noted that pixel i−n represents a pixel of the preceding line, of same abscissa as i. In known solutions, it has been determined that correction term E(i), added to original color RGB(i) of pixel i for its approximation must, to obtain an acceptable result, be equal to:

$$K1.ERR(i-1)+K2.ERR(i-n-1)+K3.ERR(i-n)+K4.ERR(i-n+1),$$

where K1, K2, K3 and K4 are predetermined fixed coefficients, and where ERR(i−1), ERR(i−n−1), ERR(i−n), and ERR(i−n+1) correspond to the error approximations calculated for pixels i−1, i−n−1, i−n, and i−n+1. In other words, $$ERR(i)=|RGB(i)+E(i)-CLUT(RGB(i)+E(i))|.$$

To obtain good results, the coefficients generally are the following: $K1=7/16$, $K2=1/16$, $K3=5/16$, and $K4=3/16$.

Such a method amounts to adding, to the future values of the four pixels adjacent to the current pixel: $7/16$ of the current error to the right-hand pixel (i+1), $3/16$ of the error to the lower left-hand pixel (i+n−1), $5/16$ of the error to the lower pixel (i+n), and $1/16$ of the error to the lower right-hand pixel (i+n+1).

A first disadvantage of the above conventional method is that it requires, for the processing of each pixel, effecting four multiplications to weight the evaluation errors of the preceding pixels, and four additions to calculate the correction term. These multiplications and additions are effected on codes having the length of the codes of the original pixel color, that is, including a large number of bits. Thus, such operations are relatively complex to implement, in particular in an integrated circuit.

A second disadvantage is that, to process a pixel of an image line, it is necessary to store in the memory the evaluation errors of three preceding pixels located on the preceding image line. Thus, this approximation method requires permanently memorizing the approximation errors calculated for the pixels of the entire preceding line. These approximation errors must be stored in a specific memory, which increases the complexity of a circuit intended for implementing this method.

SUMMARY OF THE INVENTION

An embodiment of the present invention overcomes the disadvantages of known solutions. The embodiment provides a solution for approximating the original color of the pixels of a digital image that only requires a small number of calculations and that does not require keeping in memory the approximation errors of the preceding line.

The embodiment obtains visually acceptable images, by means of a method that is simple to implement in an integrated circuit.

An embodiment of the present invention also provides a circuit for implementing such a method.

The method approximates the respective colors of pixels of a digital image by selecting, from a look-up table and successively for each pixel of the image, a color, the code of which comes close with the smallest error to the sum of the code of the current pixel color and of a correction term, in which the correction term is equal to the smallest error calculated upon approximation of a preceding pixel, assigned with a weighting coefficient depending on the position of the current pixel in the image.

According to an embodiment of the present invention, the weighting coefficient is a function of the respective least significant bits of binary codes representing the abscissa and the ordinate of the position of the current pixel.

According to an embodiment of the present invention, the weighting coefficient is chosen from among a first and a second value when the least significant bit of the abscissa of the position of the current pixel is null and when respectively, the least significant bit of the ordinate of the position of the current pixel is null or equal to one, and from among a third and a fourth value when the least significant bit of the abscissa of the position of the current pixel is equal to one and when respectively, the least significant bit of the ordinate of the current pixel position is null or equal to one.

According to an embodiment of the present invention, the first value is equal to 0.25, the second value is equal to 1.00, the third value is equal to 0.75, and the fourth value is equal to 0.50.

According to an embodiment of the present invention, the image is scanned line by line, and the correction term is null for the first pixel of each line.

An embodiment of the present invention also provides an electronic circuit that includes means for implementing any of the embodiments of the preceding approximation method.

According to an embodiment of the present invention, the electronic circuit includes a memory in which are stored the codes of the colors of the look-up table, an evaluation circuit, a first input of which is intended for receiving a color code from the memory and a second input of which receives a corrected code, for selecting the stored color, the code of which comes close with the smallest error to the corrected code and for generating a correction term equal to the difference between the selected stored color and the corrected code, and a correction circuit for generating the corrected code, equal to the sum of the code of the color of a current pixel and of the correction term, assigned with the weighting coefficient.

The foregoing objects, features and advantages of the present invention, will be discussed in detail in the following non-limiting description of specific embodiments in connection with the accompanying drawings.

DETAILED DESCRIPTION OF THE INVENTION

For clarity, the same elements have been designated by the same references in the different drawings.

A feature of the present invention is that it provides calculating by means of a coefficient, the value of which is a function of the pixel abscissa and ordinate in the image, a correction term added to the original color of each pixel, upon its approximation.

Another feature of the present invention is that the correction term, added to the original color of each pixel before approximation, is calculated based on the approximation error of a single pixel, immediately preceding the current pixel.

Figure 1:
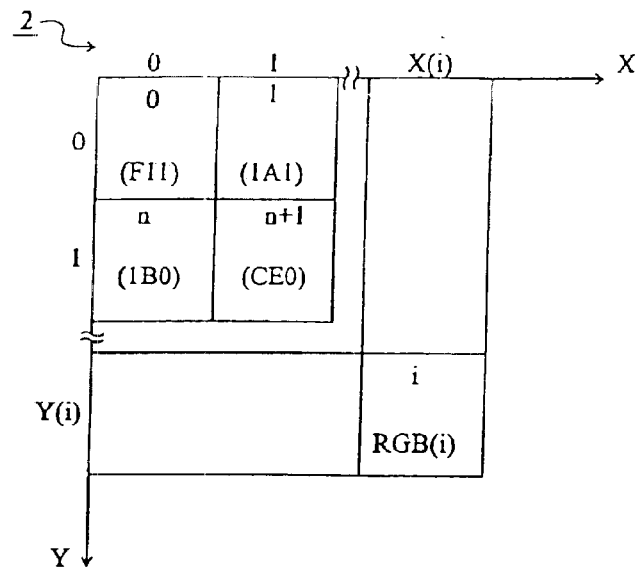
FIGS. 1 to 4, previously described, are intended for showing the state of the art and the problem to solve.
Figure 2:
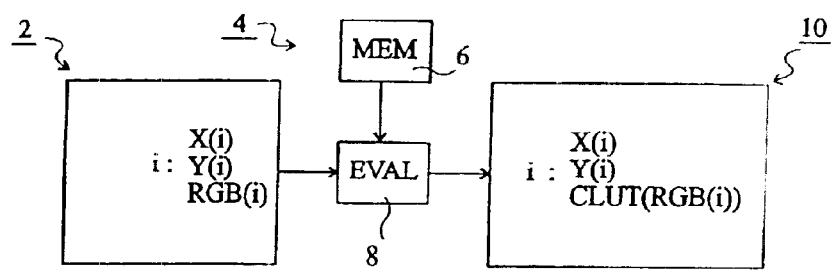
Figure 3:
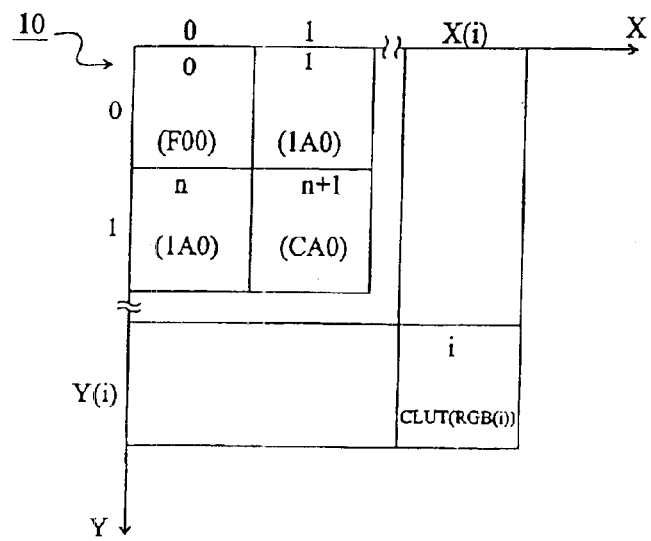
Figure 4:
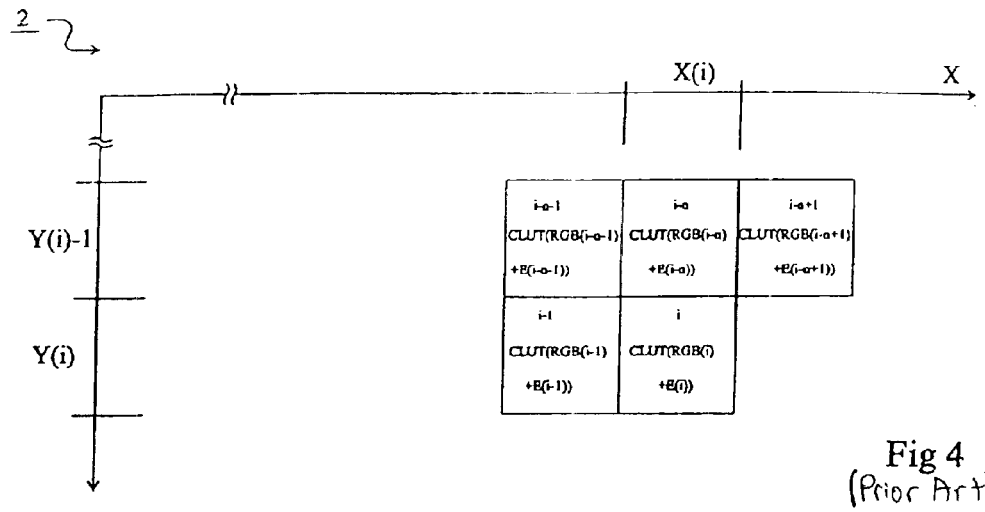
Figure 5:
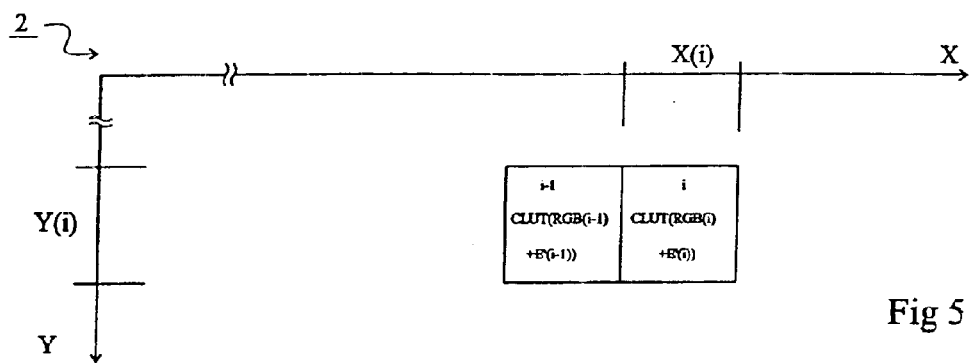
FIG. 5 schematically shows the pixels taken into account in an error distribution approximation method according to an embodiment of the present invention.

FIG. 5 schematically shows pixels i and i−1, used according to an embodiment of the present invention to calculate the correction term added to the original color of current pixel i. Keeping the previously used notations, the approximation error calculated for the pixel i−1 preceding pixel i is called ERR(i−1). This error preferably corresponds to the modulus of the difference between the code of the original color plus the correction term and the code of the closest color in the color look-up table. According to the embodiment of FIG. 5, the approximation of original color RGB(i) of pixel i is performed by searching, in the look-up table, the closest color to the sum of RGB(i) and of a correction term E'(i), where E'(i)=k'.ERR(i−1).

Coefficient k' is, according to a preferred embodiment of the present invention, determined by means of the following truth table

| pf(X(i)) | 0 0 1 1 |
| pf(Y(i)) | 0 1 0 1 |
| k' | k1 k2 k3 k4, | where pf(X(i)) and pf(Y(i)) respectively designate the least significant bit of a binary code respectively representing abscissa X(i) and ordinate Y(i) of pixel i.

Thus, the weighting coefficient is a function of the position of the pixel in the image but is the same for all the pixels having abscissa and ordinate binary codes with the same least significant bits.

The present inventors have determined that the following values may advantageously be used:

k1=0.25 k2=1.00 k3=0.75 k4=0.50.

The pixels of a digital image are, preferably and as previously, sequentially processed, line after line. Preferably, the correction term of the first pixel of each line is null, since the pixel preceding a line beginning pixel is not its neighbor in the image. It should be noted that according to the preferred embodiment of the present invention, the approximation method includes a single addition and a single multiplication for the calculation of the correction term, and that it only requires memorizing the approximation terror of the pixel preceding the current pixel. Thus, this method will be particularly simple to implement in an electronic circuit.

Figure 6:
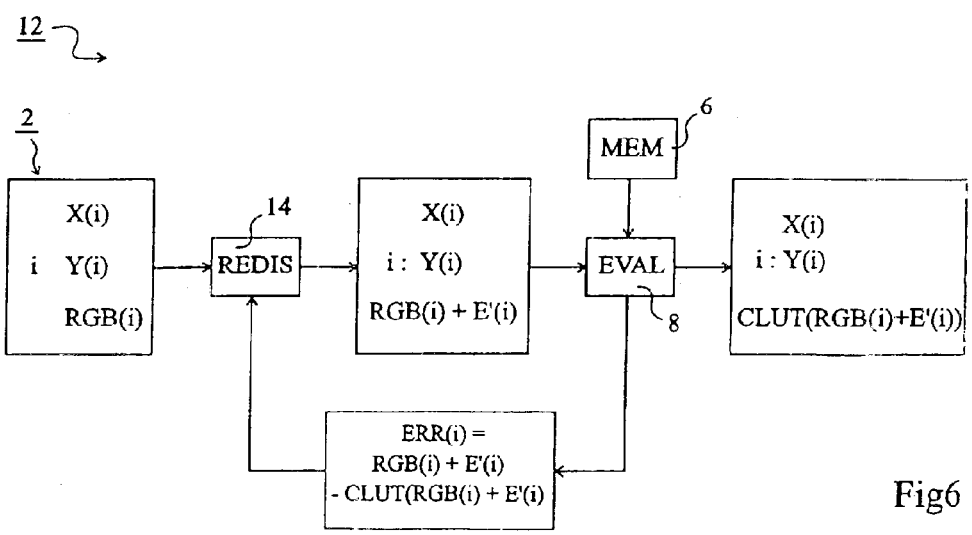
FIG. 6 schematically shows a circuit intended for implementing a color approximation method according to an embodiment of the present invention.

FIG. 6 schematically shows a circuit 12 for implementing the method just described. Circuit 12 includes a memory 6 (MEM) connected to a first input of an evaluation circuit 8 (EVAL). A correction circuit 14 (REDIS) has a first input connected for successively receiving the color of each pixel, and a second input connected for receiving the evaluation error ERR(i) made by evaluation circuit 8 upon evaluation of each pixel i.

Blocks with no reference also illustrate the data associated with the inputs-outputs of elements 6, 8, and 14 for a pixel i provided to circuit 12. For each pixel i, correction circuit 14 provides evaluation circuit 8 with the sum of the original color RGB(i) of pixel i and of the correction term E'(i) calculated based on evaluation error ERR(i−1) of the preceding pixel i−1, with E'(i)=k'.ERR(i−1), k' having been previously defined. Evaluation circuit 8 associates to this sum the look-up table color CLUT(RGB(i)+E'(i)), the color of which comes close with the smallest error. Approximation error ERR(i) provided by evaluation circuit 8 to redistribution circuit 14 for the next pixel is this smallest error.

Of course, the present invention is likely to have various alterations, modifications, and improvements which will readily occur to those skilled in the art. For example, a method in which the weighting coefficient used to calculate correction term E'(i) of a pixel i is selected from among four values according to the least significant bit of the codes of the abscissa and ordinate of this pixel has been discussed, but a greater number of weighting coefficients may also be used, for example sixteen values selected according to the two least significant bits of the abscissa and ordinate. Further, the present invention has been described in relation with RGB-coded colors, for which the distance between two colors can be evaluated by calculating the sum of the absolute values of the differences of the RGB components of the two colors, but those skilled in the art will easily adapt the present invention to colors coded differently.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of approximation of respective colors of pixels of a digital image formed of several pixel rows and pixel columns, the method comprising selecting, from a look-up table and successively for each pixel, a color having a code which comes close with a smallest error to a sum of a code of a current pixel's color and of a correction term, wherein a correction term for each pixel of each row of the digital image after a first pixel of each row is equal to a smallest error calculated upon approximation of only one preceding pixel, assigned with a weighting coefficient depending on a position of a current pixel in the image.

2. The method of claim 1, wherein the weighting coefficient is a function of respective least significant bits of binary codes representing an abscissa and an ordinate of the position of the current pixel.

3. The method of claim 2, wherein the weighting coefficient is chosen:

from among a first and a second value when the least significant bit of the abscissa of the position of the current pixel is null and when respectively, the least significant bit of the ordinate of the position of the current pixel is null or equal to one, and from among a third and a fourth value when the least significant bit of the abscissa of the position of the current pixel is equal to one and when respectively, the least significant bit of the ordinate of the position of the current pixel is null or equal to one.

4. The method of claim 3, wherein:

the first value is equal to 0.25, the second value is equal to 1.00, the third value is equal to 0.75, and the fourth value is equal to 0.50.

5. The method of claim 1, wherein the image is scanned row by row, and the correction term is null for the first pixel of each row.

6. An electronic circuit for approximating the respective colors of pixels of a digital image, including means for implementing the method of claim 1.

7. The electronic circuit of claim 6, wherein the means include:

a memory in which are stored codes of colors of the look-up table, coded in the same way as the pixel colors;

an evaluation circuit having a first input that receives a color code from the memory and a second input that receives the code of a pixel of the image plus a correction term, the evaluation circuit selecting the stored color having the code that comes close with the smallest error; and a correction circuit, an input of which is connected to an output of the evaluation circuit, for generating a corrected code, equal to the sum of the code of the color of a current pixel and of the correction term.

8. A method of compressing a digital image having pixels arranged in rows and columns and each pixel having a color represented by a color code, the method comprising:

selecting, for a current one of the pixels of the digital image, one of a plurality of weighting coefficients based on a position of the current pixel;

computing a sum of a correction term and a color code of the current pixel, the correction term being equal to an error value computed for a previous single one of the pixels multiplied by the selected weighting coefficient for the current pixel;

selecting for the current pixel an estimated color from a plurality of estimated colors, the selected estimated color being an estimated color that most closely matches the computed sum; and replacing the color code of the current pixel with the selected estimated color, wherein a correction term for each pixel of each row after a first pixel of each row is also equal to only an error value computed for a previous single one of the pixels multiplied by a selected weighting coefficient for a current pixel.

9. The method of claim 8, further comprising computing for the current pixel an error value equal to a difference between the computed sum and the color code for the current pixel and using the computed error value for the current pixel to compute a correction term for a subsequent one of the pixels.

10. The method of claim 8 wherein the position of the current pixel has an ordinate value with a first least significant bit and an abscissa value with a second least significant bit and the selected weighting coefficient is selected as a function of the first and second least significant bits.

11. The method of claim 10 wherein selecting the weighting coefficient for the current pixel includes:

selecting from among a first and a second value when the first least significant bit is null and when respectively, the second least significant bit is null or equal to one; and selecting from among a third and a fourth value when the first least significant bit is equal to one and when respectively, the second least significant bit is null or equal to one.

12. The method of claim 11 wherein:

the first value is equal to 0.25;

the second value is equal to 1.00;

the third value is equal to 0.75; and the fourth value is equal to 0.50.

13. The method of claim 8 wherein the digital image is scanned row by row, and the correction term is null for the first pixel of each row.

14. The method of claim 8 wherein the weighting coefficient selected for the current pixel is not selected for any pixels that are immediately adjacent to the current pixel.

15. A method of compressing a digital image having pixels arranged in rows and columns and each pixel having a color represented by a color code, the method comprising:

assigning a first variable correction coefficient to each pixel of a first group of pixels in the digital image, the first correction coefficient being based on a position of its corresponding pixel;

assigning a variable second correction coefficient to each pixel of a second group of pixels in the digital image, the second correction coefficient being based on a position of its corresponding pixel;

for each of the pixels of the first group, selecting an estimated color of a plurality of estimated colors, the selected estimated color being selected based on the color of the pixel and the first correction coefficient;

for each of the pixels of the second group, selecting an estimated color of the plurality of estimated colors, the selected estimated color for the pixel being selected based on the color of the pixel and the second correction coefficient; and obtaining a correction term, for each current pixel of each row after the first pixel of each row, that is based on a computed error value of only a single one of the pixels previous to the current pixel.

16. The method of claim 15 wherein the pixels of the first group are not contiguous with each other and the pixels of the second group are not contiguous with each other.

17. The method of claim 15 wherein selecting an estimated color for each pixel of the first group includes, for each pixel of the first group, computing a sum of a correction term and a color code of the pixel, the correction term being equal to an error value computed for a previous single one of the pixels of the digital image multiplied by the first correction coefficient, the selected estimated color for the pixel being the estimated color that most closely matches the computed sum.

18. The method of claim 17, further comprising, for each pixel of the first group, computing an error value equal to a difference between the computed sum for the pixel and the color code for the pixel and using the computed error value for the pixel to compute a correction term for a subsequent one of the pixels of the digital image.

19. The method of claim 15 wherein the pixels of the first group alternate with the pixels of the second group in the digital image.

20. The method of claim 15, further comprising:

assigning a third correction coefficient to each pixel of a third group of pixels in the digital image;

assigning a fourth correction coefficient to each pixel of a fourth group of pixels in the digital image;

for each of the pixels of the third group, selecting an estimated color of the plurality of estimated colors, the selected estimated color for the pixel being selected based on the color of the pixel and the third correction coefficient; and for each of the pixels of the fourth group, selecting an estimated color of the plurality of estimated colors, the selected estimated color for the pixel being selected based on the color of the pixel and the fourth correction coefficient, wherein the pixels of the first and second groups alternate with each other in a first line of the digital image and the pixels in the third and fourth groups alternate with each other in a second line of the digital image, the second line being immediately adjacent to the first line.

* * * * *